(12) United States Patent
Yamamoto

(10) Patent No.: US 11,484,855 B2
(45) Date of Patent: Nov. 1, 2022

(54) GAS GENERATOR

(71) Applicant: DAICEL CORPORATION, Osaka (JP)

(72) Inventor: Koji Yamamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 191 days.

(21) Appl. No.: 17/058,204

(22) PCT Filed: May 21, 2019

(86) PCT No.: PCT/JP2019/020148
§ 371 (c)(1),
(2) Date: Nov. 24, 2020

(87) PCT Pub. No.: WO2019/230503
PCT Pub. Date: Dec. 5, 2019

(65) Prior Publication Data
US 2021/0154633 A1 May 27, 2021

(30) Foreign Application Priority Data
May 29, 2018 (JP) .............................. JP2018-102719

(51) Int. Cl.
*B01J 7/00* (2006.01)
(52) U.S. Cl.
CPC ...................................... *B01J 7/00* (2013.01)
(58) Field of Classification Search
CPC ........ B01J 7/00; B60R 21/263; B60R 21/264; B60R 2021/26029
See application file for complete search history.

(56) References Cited

U.S. PATENT DOCUMENTS 5,613,706 A * 3/1997 Parker ................. B60R 21/2644
280/736
5,813,695 A * 9/1998 O'Driscoll ............... B21J 15/02
280/736

(Continued)

FOREIGN PATENT DOCUMENTS

JP 2010-163025 A 7/2010

OTHER PUBLICATIONS

English Translation of the International Search Report issued in International Application No. PCT/JP2019/020148 dated Jul. 9, 2019.

(Continued)

*Primary Examiner* — Kaity V Chandler
(74) *Attorney, Agent, or Firm* — Birch, Stewart, Kolasch & Birch, LLP

(57) ABSTRACT

A gas generator including a first igniter, a second igniter, a partition wall that partitions inside a housing into a first space that contains a first gas generating agent and a second space that contains a second gas generating agent, and an inner cylindrical member that houses the first igniter and includes a communication portion at a first end portion, the gas generator further including a closing member that closes a third space that is formed between an inner wall surface of the inner cylindrical member and an outer wall surface of the fixing portion and that connects the communication portion with the first space, the closing member being inhibited from deforming due to pressure from a side of the first space and allowing deformation due to pressure from a side of the third space that negates a closed state between the first space and the third space.

19 Claims, 6 Drawing Sheets

(56) References Cited

U.S. PATENT DOCUMENTS

| | | | | |
|---|---|---|---|---|
| 5,955,699 | A * | 9/1999 | Perotto | B60R 21/2644 422/166 |
| 6,019,389 | A * | 2/2000 | Burgi | B60R 21/272 280/736 |
| 6,053,531 | A * | 4/2000 | Katsuda | B60R 21/2644 280/741 |
| 6,079,739 | A * | 6/2000 | Perotto | B60R 21/2644 280/736 |
| 6,412,815 | B1 * | 7/2002 | Nakashima | B60R 21/2644 280/736 |
| 6,474,684 | B1 * | 11/2002 | Ludwig | C06D 5/06 280/736 |
| 6,543,805 | B2 | 4/2003 | McFarland et al. | |
| 6,722,694 | B1 * | 4/2004 | Nakashima | B60R 21/2644 280/736 |
| 7,137,339 | B2 * | 11/2006 | Bierwirth | B60R 21/2644 280/736 |
| 8,074,571 | B2 * | 12/2011 | Hirooka | B60R 22/26 102/202.5 |
| 8,282,127 | B1 * | 10/2012 | Morgan | B60R 21/263 280/736 |
| 8,556,294 | B1 * | 10/2013 | Norman, III | B60R 21/264 280/736 |
| 8,893,622 | B2 * | 11/2014 | Jackson | B60R 21/2644 280/741 |
| 9,550,471 | B1 * | 1/2017 | Quioc | B60R 21/2644 |
| 10,814,827 | B2 * | 10/2020 | Izuma | B60R 21/26 |
| 10,814,828 | B2 * | 10/2020 | Fukui | B60R 21/264 |
| 10,974,687 | B2 * | 4/2021 | Fukui | B60R 21/2644 |
| 2002/0063420 | A1 * | 5/2002 | Nakashima | B01D 46/24 280/736 |
| 2002/0175509 | A1 * | 11/2002 | Iwai | B60R 21/2644 280/741 |
| 2003/0047925 | A1 * | 3/2003 | Edwards, II | B60R 21/2644 280/741 |
| 2003/0127840 | A1 * | 7/2003 | Nakashima | B60R 21/2644 280/741 |
| 2003/0137139 | A1 * | 7/2003 | Iwai | B60R 21/2644 280/741 |
| 2003/0234526 | A1 * | 12/2003 | Quioc | B60R 21/2644 280/736 |
| 2008/0063993 | A1 * | 3/2008 | Katsuda | B60R 21/26 431/253 |
| 2008/0136152 | A1 * | 6/2008 | McFarland | B60R 21/263 280/736 |
| 2009/0288574 | A1 * | 11/2009 | Jackson | B60R 21/2644 102/530 |
| 2011/0221175 | A1 | 9/2011 | Kobayashi et al. | |
| 2013/0200600 | A1 * | 8/2013 | Bierwirth | B60R 21/261 280/740 |
| 2013/0255528 | A1 * | 10/2013 | Ozaki | B60R 21/2644 102/530 |
| 2013/0283760 | A1 * | 10/2013 | Kobayashi | F02G 3/00 60/39.12 |
| 2014/0054881 | A1 * | 2/2014 | Fukawatase | C06D 5/00 280/741 |
| 2014/0096697 | A1 * | 4/2014 | Okuyama | C06D 5/00 102/530 |
| 2015/0217717 | A1 * | 8/2015 | Ohsugi | B01J 7/00 102/530 |
| 2015/0225308 | A1 * | 8/2015 | Fujisaki | C06B 23/02 280/740 |
| 2016/0052486 | A1 * | 2/2016 | Ohsugi | B60R 21/26 102/530 |
| 2016/0121841 | A1 * | 5/2016 | Katsuta | B60R 21/2644 102/530 |
| 2016/0167617 | A1 * | 6/2016 | Wang | B60R 21/276 280/736 |
| 2016/0362082 | A1 * | 12/2016 | Okuyama | B60R 21/264 |
| 2017/0028963 | A1 * | 2/2017 | Katsuta | B60R 21/264 |
| 2018/0215341 | A1 * | 8/2018 | Izuma | B60R 21/2644 |
| 2019/0241149 | A1 * | 8/2019 | Kobayashi | B60R 21/268 |
| 2020/0039463 | A1 * | 2/2020 | Fukui | F42B 3/12 |
| 2020/0231112 | A1 * | 7/2020 | Yamamoto | B01J 7/00 |

OTHER PUBLICATIONS

English Translation of the Written Opinion issued in International Application No. PCT/JP2019/020148 dated Jul. 9, 2019.
International Search Report issued in International Application No. PCT/JP2019/020148 dated Jul. 9, 2019.
Written Opinion issued in International Application No. PCT/JP2019/020148 dated Jul. 9, 2019.

* cited by examiner

GAS GENERATOR

TECHNICAL FIELD

The present invention relates to a gas generator configured to burn a gas generating agent by actuation of an igniter, thereby generating combustion gas.

BACKGROUND ART

Gas generators generate combustion gas by burning a gas generating agent contained inside a combustion chamber. Technology is being developed to set a characteristic (hereinafter, discharge characteristic) with a parameter such as discharge amount or discharge time of the combustion gas to a desired characteristic by using two igniters and controlling the combustion timing of the gas generating agent of each igniter. For example, in the gas generator described in Patent Document 1, two igniters (a first igniter and a second igniter) are disposed in a housing of the gas generator. This gas generating agent has a configuration in which in the first igniter and the second igniter, different gas generating agents to be combusted are disposed in different combustion chambers, and the combustion gases generated in each combustion chamber are discharged to the outside from a common discharge port provided in the housing. Here, the first igniter is disposed in a manner allowing a first ignition charge contained in the cap to be burned first. In the state prior to the combustion of the first igniter, a communication hole connected to the space in which the first gas generating agent that is ultimately combusted in the first igniter is contained is closed by a circumferential wall of the cap. Then, when the first igniter is activated and the first ignition charge is combusted, the cap slides upward by the combustion pressure, and the blocked communication hole opens. As a result, the combustion product of the first igniter comes into contact with the first gas generating agent through the communication hole, initiating the combustion of the first gas generating agent. Note that for a second igniter that operates after a first igniter, combustion of the second gas generating agent corresponding to the second igniter is executed, but the second gas generating agent is contained in a space segregated from the first ignition charge and the first gas generating agent combusted in the first igniter.

Also, Patent Document 2 discloses a gas generator including one igniter. In this gas generator, the communication hole is provided in an inner cylindrical member so that, when a combustion product generated by a transfer charge for initial combustion by an igniter provided on the inside of the inner cylindrical member is guided to the gas generating agent side of another chamber provided outside of the inner cylindrical member, the combustion product is guided to a bottom surface of the other chamber. The combustion product that passes through this communication hole causes the gas generating agent in the other chamber to ignite from the bottom toward the top.

CITATION LIST

Patent Document

Patent Document 1: U.S. Pat. No. 6,543,805
Patent Document 2: JP 2010-163025 A

SUMMARY OF INVENTION

Technical Problem

In a gas generator including two igniters, when the combustion timings of the gas generating agents corresponding to the two igniters are offset, the discharge characteristic of the combustion gas from the gas generator deviates from the desired characteristic, which is not preferable. In particular, when the combustion gas generated by the combustion of the gas generating agent flows inside the housing through a flow path different from that intended inside the housing of the gas generator, the release characteristic of the combustion gas caused by the gas generator can vary greatly. For example, when the combustion gas generated by the operation of one of the igniters flows reverse to the intended flow and burns the gas generating agent corresponding to the other igniter, the release characteristic of the combustion gas caused by the gas generator is significantly diminished.

As in the related art, when using a configuration in which a rise in pressure caused by the combustion product of the ignition charge slides the cap inside the housing to control the flow of the combustion product (in other words, a configuration in which the opening and closing of a communication hole is controlled), the housing is required to be appropriately disposed so that the cap can slide at a predetermined pressure and load. Building such a gas generator, however, is not a simple task. Also, if the cap is not appropriately placed inside the housing, for example, the cap being tilted inside the housing, the cap will not suitably slide despite the actuation of the igniter, and in some cases, the pressure inside the housing may increase excessively.

In light of the problems described above, an object of the present invention is to provide a technology for suitably controlling the flow of a combustion product such as a combustion gas inside a housing of a gas generator.

Solution to Problem

In order to solve the above problems, the present invention employs a configuration in which, in the housing of a gas generator including two igniters, the closing and opening of a third space through which a combustion product flows is controlled via the deformation of a closing member. In other words, by configuring the closing member to be resistant to deformation due to pressure from one direction but likely to deform due to pressure from another direction, the flow of the combustion product can be suitably controlled via the third space. As a result, each igniter burns the gas generating agent at an intended timing and the combustion product is suitably discharged from the gas generator. In this manner, a suitable discharge characteristic can be achieved.

Specifically, the present invention is a gas generator, comprising:

a first igniter disposed inside the housing;

a second igniter disposed inside the housing that actuates concurrent to or later than the first igniter;

a partition wall that partitions inside the housing into a first space in which the first igniter is housed and that contains a first gas generating agent burnt by the first igniter and a second space in which the second igniter is housed and that contains a second gas generating agent burnt by the second igniter;

a discharge port provided in the housing that connects the first space and an outside of the housing; and an inner cylindrical member with a cylindrical shape housing therein the first igniter, an inner space of the inner cylindrical member being a portion of the first space. Also, the housing includes a fixing portion that extends from a bottom surface of the housing toward a top surface and fixes the first igniter;

the inner cylindrical member includes a communication portion provided at a first end portion corresponding to an end portion of the inner cylindrical member on a side of the fixing portion and that connects the inner space of the inner cylindrical member and the second space outside of the inner cylindrical member; and a closing member that closes, from the first space, a third space that is formed between an inner wall surface of the inner cylindrical member and an outer wall surface of the fixing portion and that connects the communication portion with the first space, the closing member being inhibited from deforming due to pressure from a side of the first space and allowing deformation due to pressure from a side of the third space that negates a closed state between the first space and the third space.

The gas generator according to the present invention includes a first igniter and a second igniter, the first igniter burning the first gas generating agent and the second igniter burning the second gas generating agent. Note that the first igniter is fixed to the housing by the fixing portion. However the fixing portion may be an integral part of the housing, form a portion of the housing, or the housing may be formed with the fixing portion, as a separate member, connected thereto. The first gas generating agent and the second gas generating agent may be gas generating agents of the same type, the same shape, and the same size, or may be different types, different shapes, or different sizes. How the gas generating agents are used may be determined as appropriate depending on the discharge characteristic of the combustion product of the gas generator. The partition wall forms the first space containing the first gas generating agent and the second space containing the second gas generating agent into separate spaces inside the housing, in essence. Furthermore, the inner cylindrical member houses the first igniter, thus segregating the first space from the second space via the inner cylindrical member. With this partition wall and the inner cylindrical member, the gas generating agents can be prevented from being burned directly by the action of the non-corresponding igniter, and the burning of the gas generating agents by the corresponding igniter is easily controlled as desired.

On the other hand, the communication portion is provided at the first end portion of the inner cylindrical member, and in this respect, the first space and the second space are not in a segregated state. The communication portion is for the combustion product generated by the combustion to flow from the second space to the first space via the third space. Note that the third space is a space surrounded by the inner cylindrical member, the fixing portion, and the closing member, and connects to the second space via the communication portion. However, the third space does not contain the first gas generating agent nor the second gas generating agent. In the gas generator described above, the first space is connected to the outside via the discharge hole, but the second space is not directly connected to the outside via the discharge hole. That is, in the gas generator described above, the combustion product generated by the combustion of the first gas generating agent in the first space is discharged to the outside via the discharge hole. However, the combustion product generated by the combustion of the second gas generating agent in the second space is discharged from the discharge hole to the outside after flowing into the first space via the communication portion and the third space. The generation of this intended flow of the combustion product allows the discharge characteristic designed for the gas generator to be achieved.

In other words, when the first gas generating agent burns in the first space, when the combustion product flows into the third space and the communication portion, the discharge characteristic of the combustion product from the discharge hole differs from the intended discharge characteristic; and when the second gas generating agent burns in the second space, when the combustion product does not flow into the communication portion and the third space, the discharge characteristic of the combustion product from the discharge hole is different from the intended characteristic. That is, from the perspective of the discharge characteristic of the combustion product, the flow of the combustion product in the communication portion and the third space needs to be a flow in accordance with the combustion of the gas generating agent in the first space and the second space.

Thus, in the gas generator according to the present invention, the closing member is provided to suitably control the flow of the combustion product in the communication portion and the third space. The closing member is a member that closes the third space from the first space. When the third space is closed by the closing member, the flow of the combustion product between the third space and the first space will be inhibited. Here, the closing member is configured so that deformation thereof is inhibited by the inner cylindrical member and the fixing portion with respect to pressure from the side of the first space. That is, even if the first gas generating agent burns in the first space and the pressure rises, the closed state of the third space caused by the closing member is maintained. At this time, the combustion product generated by the combustion of the first gas generating agent does not flow into the third space and the communication portion. Note that the deformation of the closing member in the present application means a change in the shape and state of the closing member that negates the closed state caused by the closing member. Thus, deformation of the closing member in the present application includes, in addition to a change in shape such as the closing member bending, a portion of the closing member breaking, being ruptured, melted, bored, and the like. On the other hand, the closing member is configured so that the deformation of the closing member due to the pressure from the side of the third space is allowed and the closed state of the third space caused by the closing member is negated. Note that because the third space is closed from the first space by the closing member, the combustion product generated by the second gas generating agent being combusted in the second space can enter the communication portion and the third space. Thus, when the second gas generating agent is combusted and the pressure in the second space rises, the pressure in the third space also rises. Then, when the pressure in the third space rises due to the combustion, the closing member is deformed and the combustion product can move from the second space to the first space via the communication portion and the third space. The flow of the combustion product in the communication portion and the third space is controlled by the closing member configured in this manner so as to be a flow in accordance with the combustion of the gas generating agent in each space.

According to the gas generator configured in this manner, when the first gas generating agent is combusted by the actuation of the first igniter, the third space is maintained in the closed state by the closing member, so the combustion product of the first gas generating agent is discharged to the outside from the discharge hole without flowing into the third space. Furthermore, when the second gas generating agent is combusted by the second igniter that actuates after the first igniter, the closing member deforms, and the closed state of the third space is negated. Accordingly, the combustion product of the second gas generating agent flows into the first space via the communication portion and the third space, and is discharged to the outside from the discharge hole. In this way, in the gas generator described above, the flow of the combustion product in the housing is controlled as desired, and an intended discharge characteristic is achieved.

In the gas generator described above, the inner cylindrical member may include a projection portion that projects toward the inner space and abuts a cylindrical portion formed on the fixing portion; and a space formed by the inner wall surface of the inner cylindrical member not in contact with the cylindrical portion and an outer wall surface of the cylindrical portion may be the third space. Because the relative position of the inner cylindrical member with respect to the fixing portion is determined by the projection portion abutting against the cylindrical portion of the fixing portion, the gas generator is easily assembled. On the other hand, the inner wall surface of the inner cylindrical member that is not in contact with the cylindrical portion is distant from the outer wall surface of the cylindrical portion of the fixing portion, forming a gap (in other words, the third space) between the inner wall surface and the cylindrical portion. Thus, the combustion product of the second gas generating agent can flow into the first space through the third space.

Also, in the gas generator described above, the communication portion may be formed by a gap between the first end portion of the inner cylindrical member and the bottom surface of the housing. The first end portion of the inner cylindrical member is provided on the bottom surface side of the housing. In the case in which a portion or all of the first end portion of the inner cylindrical member forms a gap separated from the bottom surface of the housing, the gap allows the second space and the third space to communicate with one another.

In the gas generator described above, the first end portion of the inner cylindrical member may include removed portions, which are portions partially removed from a circumferential edge of the first end portion; and the communication portion may be formed by the gap between the removed portions and the bottom surface of the housing. By including these removed portions, even in the case in which one end portion of the inner cylindrical member is abutted against the bottom surface of the housing, for example, the removed portions are distanced from the bottom surface of the housing, and thus gaps are formed between the removed portions and the bottom surface of the housing. The gap allows the second space and the third space to communicate with one another. According to such a configuration, the communication portion is formed even when the first end portion of the inner cylindrical member is abutted against the bottom surface of the housing. This facilitates positioning of the inner cylindrical member, and thus facilitates the assembly of the gas generator. Furthermore, compared to a case in which a hole corresponding to the communication portion is formed in the circumferential wall of the cylindrical member, the communication portion is formed in the corner portion formed by the bottom surface of the housing and the cylindrical member. Thus, the space around the communication portion is easily formed and the combustion gas from the second gas generating agent is not easily closed off.

In the gas generator described above, the closing member may be disposed and located on the inner wall surface of the inner cylindrical member on the side of the first space and closing an opening portion of the third space to the first space. By disposing the closing member on the inner wall surface on the side of the first space in this way, it is possible to form a state in which the third space is closed from the first space, making assembly of the gas generator easier. In particular, the negation of the closed state of the third space is caused by deformation of the closing member, and it is not necessary to cause the closing member to slide as in the related art. Therefore, it is not necessary to strictly manage the insertion force affected by the processing tolerances of the closing member and the inner cylindrical member, and it is possible to simplify the assembly procedure of the gas generator. Note that as long as the closed state of the third space is negated, sliding may occur with the deformation of the closing member, and such a case also falls within the scope of the disclosure of the present application.

In the gas generator described above, the closing member may include a circumferential wall surface extending along the inner cylindrical member, and an extension portion extending from at or near an end portion of the circumferential wall surface in an extension direction and extending inward in a radial direction of the inner cylindrical member to the fixing portion, the extension portion closing the opening portion of the third space to the first space. In other words, the extension portion extends from the inner wall surface of the inner cylindrical member to the fixing portion, and closes the third space from the first space. According to such a configuration, the pressure caused by the combustion product of the second gas generating agent acts on the extension portion of the closing member from the side of the third space. Here, the end portion of the extension portion on the inner cylindrical member side (outer circumferential edge side) has relatively high rigidity due to the circumferential wall surface being provided. On the other hand, the end portion of the extension portion on the fixing portion side (inner circumferential edge side) has relatively low rigidity. Thus, when pressure caused by the combustion product of the second gas generating agent acts on the extension portion of the closing member from the side of the third space, the extension portion on the fixing portion side quickly deforms, allowing the combustion product to flow from the third space to the first space. On the other hand, when pressure caused by the combustion product of the first gas generating agent acts in a direction to deform the extension portion from the side of the first space to the side of the third space, because the extension portion is abutted against the fixing portion, deformation is suppressed. Accordingly, the movement of the combustion product of the first gas generating agent from the first space to the third space can be suppressed.

Also, in the gas generator described above, the extension portion may include a fragile portion that is provided with a less strength than other portions of the extension portion and that deforms due to the allowed deformation caused by a combustion product of the second gas generating agent. By including the fragile portion, when pressure is applied by the combustion product of the second gas generating agent, the extension portion can quickly deform, allowing the combustion product to flow quickly from the third space to the first space.

Specific configurations of the gas generator described above will now be described as examples. Note that, in the gas generator described above, the partition wall may be configured to divide the internal space of the housing into an upper space and a lower space. In this case, the inner cylindrical member may extend through the vertical partition wall, the first end portion of the inner cylindrical member may be located in the lower space, and a second end portion corresponding to an end portion on a side opposite the first end portion of the inner cylindrical member may be located in the upper space; and the first space may be formed with the inner space of the inner cylindrical member connected to the upper space and a space around the inner cylindrical member of the lower space may be the second space. Note that the specific configuration described above is an example and does not restrict other configurations from being applied to the gas generator of the present invention.

Also, the gas generator described above may further include a filter disposed in the first space that cools or filters a combustion product of the first gas generating agent and the second gas generating agent. In the gas generator described above, the first space is connected to the outside via the discharge hole, but the second space is not directly connected to the outside via the discharge hole. Thus, in the case in which the filter is disposed in the first space, one filter is capable of cooling or filtering the combustion product of the first gas generating agent and cooling and filtering the combustion product of the second gas generating agent. Thus, the number of parts can be reduced in comparison to a case in which a filter is disposed for the combustion product of each gas generating agent. In addition, since it is not necessary to prepare a space in which the filter is disposed in the second space, it is possible to reduce the size of the gas generator.

Advantageous Effects of Invention

According to the present invention, the flow of a combustion product such as a combustion gas inside a housing of a gas generator can be suitably controlled.

DESCRIPTION OF EMBODIMENTS

A gas generator according to an embodiment of the present invention will be described below with reference to the drawings. Note that configurations of the following embodiment are provided as examples, and the present invention is not limited to the configurations of the embodiment.

First Example

Figure 1:
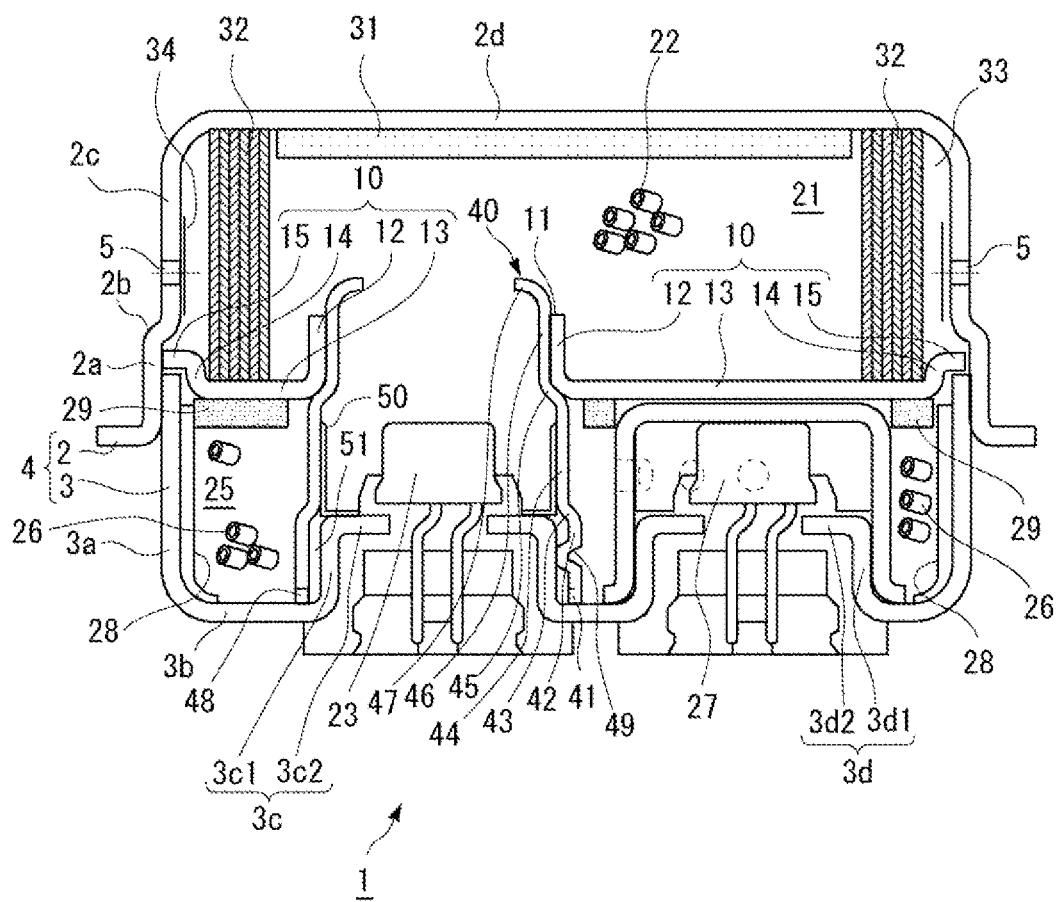
FIG. 1 is a cross-sectional view in a height direction of a gas generator of a first example.

FIG. 1 is a cross-sectional view in a height direction of a gas generator 1. The gas generator 1 is configured to burn a gas generating agent contained in a housing 4 formed by an upper shell 2 and a lower shell 3 and to discharge a combustion gas, which is a combustion product. Note that the upper side of FIG. 1 is the upper side of the gas generator 1, and the lower side of FIG. 1 is the lower side of the gas generator 1. The upper shell 2 includes a circumferential wall 2c and a top surface 2d, which form an internal space having a concave shape. The top surface 2d and a bottom surface 3b of the lower shell 3 described below are substantially circular when viewed from above. The circumferential wall 2c and a circumferential wall 3a of the lower shell 3 described below surround the top surface 2d and the bottom surface 3b, respectively, and extend substantially perpendicularly from the corresponding surfaces to form annular wall surfaces. The internal space of the upper shell 2 is a space containing a first gas generating agent 22 as described below. The top surface 2d is connected to one end of the circumferential wall 2c, and the other end of the circumferential wall 2c serves as an opening of the upper shell 2. Further, on the other end side of the circumferential wall 2c, a mating wall 2a and an abutting portion 2b are provided in this order from the opening. The radius of the internal space formed by the mating wall 2a is larger than the radius of the internal space formed by the circumferential wall 2c on a side nearer to the top surface 2d, and the mating wall 2a connects to the circumferential wall 2c, with the abutting portion 2b interposed therebetween.

Furthermore, the lower shell 3 includes the circumferential wall 3a and the bottom surface 3b which form a recessed internal space. The internal space is a space containing a second gas generating agent 26 as described later. The bottom surface 3b is connected to one end of the circumferential wall 3a, and the other end of the circumferential wall 3a serves as an opening of the lower shell 3. The radius of the internal space formed by the circumferential wall 3a is substantially the same as the radius of the internal space formed by the circumferential wall 2c of the upper shell 2. The bottom surface 3b of the lower shell 3 is provided with first fixing portion 3c and a second fixing portion 3d for fixing a first igniter 23 and a second igniter 27, respectively. The first fixing portion 3c includes a cylindrical portion 3c1, and the cylindrical portion 3c1 is formed extending substantially vertically from the bottom surface portion 3b toward the top surface 2d. Similarly, the second fixing portion 3d includes a cylindrical portion 3d1, and the cylindrical portion 3d1 is formed extending substantially vertically from the bottom surface portion 3b toward the top surface 2d. On an end portion of the first fixing portion 3c on the top surface 2d side, a top portion 3c2 is provided that extends substantially parallel with the bottom surface 3b toward the center axis of the cylindrical portion 3c1 from the cylindrical portion 3c1. Similarly, on an end portion of the second fixing portion 3d, a top portion 3d2 is provided that extends substantially parallel with the bottom surface 3b toward the center axis of the cylindrical portion 3d1 from the cylindrical portion 3d1. Note that in another embodiment, the first fixing portion 3c and the second fixing portion 3d may be separate members from the bottom surface 3b. In this case, the first fixing portion 3c and the second fixing portion 3d, which are separate members, are fixed to the bottom surface 3b by an appropriate fixing method such as welding.

Furthermore, a vertical partition wall 10 and an inner cylindrical member 40 are disposed in the housing 4 between the upper shell 2 and the lower shell 3. The vertical partition wall 10 and the inner cylindrical member 40 cooperate to divide the space inside the housing 4 into a first space 21 (upper space) containing the first gas generating agent 22 and a second space 25 (lower space) containing the second gas generating agent 26. Furthermore, the inner cylindrical member 40 is a member with a cylindrical shape that includes a space inside. Also, the inner cylindrical member 40 includes a first end portion 41 that joins to the bottom surface 3b of the lower shell 3, a first circumferential wall 42 that extends upward from the end portion 41 with the diameter of the internal space being greater than the outer diameter of the cylindrical portion 3c1 of the first fixing portion 3c, a first connection portion 43 that connects to the first circumferential wall 42, a second circumferential wall 44 that extends upward from and connects to the first connection portion 43 with the diameter of the internal space being less than that of the first circumferential wall 42, a second connection portion 45 that connects to the second circumferential wall 44, a mating wall 46 that extends upward from and connects to the second connection portion 45 with the diameter of the internal space being less than that of the second circumferential wall 44, and a second end portion 47 that connects to the mating wall 46, bends toward the internal space, and ends, the end edge thereof forming an opening portion. As illustrated in FIG. 1, by attaching the inner cylindrical member 40 to the bottom surface 3b with the first end portion 41 being located near the first fixing portion 3c of the lower shell 3 and the first igniter 23 fixed to the first fixing portion 3c being housed inside the inner cylindrical member 40, the first circumferential wall 42, the second circumferential wall 44, and the mating wall 46 are disposed in a state substantially perpendicular to the bottom surface 3b and extending toward the top surface 2d.

Figure 2:
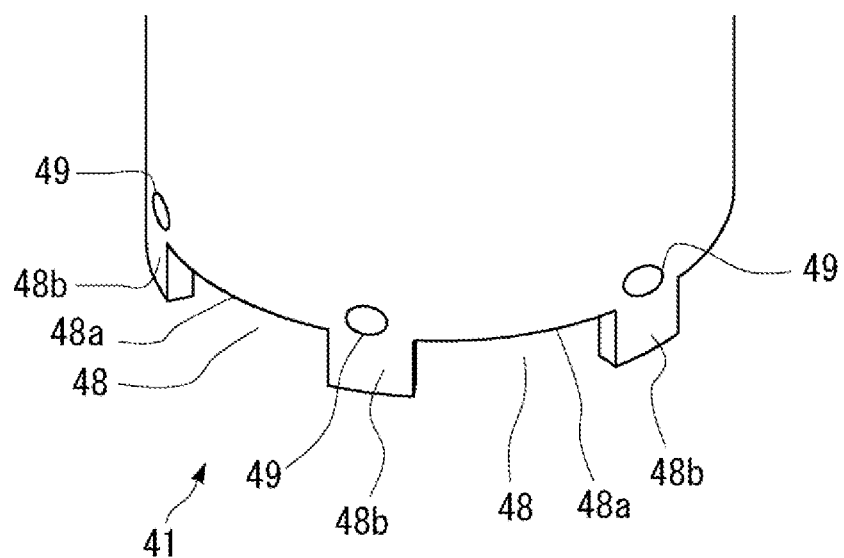
FIG. 2 is a schematic configuration diagram of a first end portion of an inner cylindrical member provided in the gas generator illustrated in FIG. 1.

Further, a communication hole 48 that connects the inner space and the outer space of the inner cylindrical member 40 is provided in the first circumferential wall 42 of the inner cylindrical member 40. FIG. 2 is a schematic configuration diagram of the first end portion 41 of the inner cylindrical member 40. On the first end portion 41 of the inner cylindrical member 40, a plurality of recess portions 48a, where a portion of the periphery is missing, and a plurality of protrusion portions 48b, where the periphery is not missing, are formed alternately in the circumferential direction of the inner cylindrical member 40. Note that the recess portions 48a in FIG. 2 are formed by removing portions of the first end portion 41 to form rectangles as viewed from a radial direction of the inner cylindrical member 40. The plurality of recess portions 48a with the same shape and the plurality of protrusion portions 48b with the same shape are formed evenly around the circumferential direction of the inner cylindrical member 40. The protrusion portions 48b abut against the bottom surface 3b of the lower shell 3. Gaps are formed between the recess portions 48a and the bottom surface 3b of the lower shell 3. These gaps function as the communication holes 48. The communication hole 48 corresponds to the communication portion of the present invention. Additionally, the recess portions 48a correspond to the removed portions in the present invention. Additionally, the recess portions 48a are adjusted to a size that allows the second gas generating agent 26 to pass through.

Furthermore, the inner cylindrical member 40 is provided evenly in the circumferential direction of the inner cylindrical member 40 with a plurality of projection portions 49. The projection portions 49 each project from the inner wall surface of the inner cylindrical member 40 toward the center axis of the inner cylindrical member 40. The projection portion 49 is formed by working the inner cylindrical member 40 from the outside to form the projection portion 49 facing inward. When the inner cylindrical member 40 is disposed housing the first fixing portion 3c, the position and projection amount of the projection portions 49 are adjusted so that the projection portions 49 abut against the outer wall surface of the cylindrical portion 3c1 of the first fixing portion 3c. Gaps are formed between the inner wall surface of the inner cylindrical member 40 at sections where the projection portions 49 are not formed and the outer wall surface of the cylindrical portion 3c1 of the first fixing portion 3c. These gaps allow the combustion gas through. Furthermore, as illustrated in FIG. 1, a closing member 50 is disposed in the inner space of the inner cylindrical member 40. The closing member 50 is disposed closing the opening portion of the space from the communication hole 48 to the first space 21. The closing member 50 will be described in detail below. The inner space of the inner cylindrical member 40 from the communication hole 48 to the closing member 50 is defined as a third space 51.

Also, the partition wall 10 includes a terminating end 15, a mating wall 14 extending from the terminating end 15 along the circumferential wall 3a of the lower shell 3, a dividing wall 13 that connects to the mating wall 14 and divides the inside of the housing 4 substantially into upper and lower spaces, and a circumferential wall 12 that connects to the dividing wall 13 and extends toward the top surface 2d of the upper shell 2. Note that an open end portion 11 of the circumferential wall 12 forms an opening through which the inner cylindrical member 40 extends through the vertical partition wall 10. Then, as illustrated in FIG. 1, when the terminating end 15 is disposed above the terminating end surface of the circumferential wall 3a of the lower shell 3 and the vertical partition wall 10 is attached to the housing 4, the mating wall 46 of the inner cylindrical member 40 is fitted into the opening portion of the vertical partition wall 10 formed by the open end portion 11. As a result, the vertical partition wall 10 is disposed inside the housing 4 supported by the circumferential wall 3a of the lower shell 3 and the inner cylindrical member 40. In this arrangement, the dividing wall 13 forms a wall surface substantially parallel with the top surface 2d of the upper shell 2 and the bottom surface 3b of the lower shell 3.

To assemble the gas generator 1, the first igniter 23 and the second igniter 27 are fixed to the first fixing portion 3c and the second fixing portion 3d of the lower shell 3, respectively, and the inner cylindrical member 40 is abutted against the lower shell 3 with the inner cylindrical member 40 housing the first igniter 23. At this time, the closing member 50 may also be attached (the closing member 50 may be inserted from the first end portion 41 side before the inner cylindrical member 40 is attached to the lower shell 3). By disposing the inner cylindrical member 40 is this manner, the second space 25 is formed outside of the inner cylindrical member 40. The second space 25 is filled with the second gas generating agent 26. After the second gas generating agent 26 is inserted, the vertical partition wall 10 is attached to the lower shell 3 and the inner cylindrical member 40. At this time, a cushion 29 for reducing the vibration of the second gas generating agent 26 is disposed between the vertical partition wall 10 and the inserted second gas generating agent 26. In addition, a resin sheet member 28 for reducing powdering of the second gas generating agent 26 caused by the second gas generating agent 26 coming into contact with the lower shell 3 is disposed on the inner wall surface of the circumferential wall 3a of the lower shell 3.

After the vertical partition wall 10 is attached, a filter 32 is disposed, and the first gas generating agent 22 is inserted on the inner side of the filter 32 and the upper shell 2 is attached. As described above, the radius of the internal space formed by the mating wall 2a of the upper shell 2 is formed greater than the radius of the internal space formed by the circumferential wall 2c, and thus the upper shell 2 is fitted to the lower shell 3 until the abutting section 2b abuts against the terminating end 15 of the vertical partition wall 10. In the state where the abutting portion 2b of the upper shell 2 abuts on the terminating end 15, the mating wall 14 is mated with the circumferential wall 3a of the lower shell 3. Note that, in the housing 4, the contacting areas of the upper shell 2 and the lower shell 3 are joined by a joining method (for example, welding or the like) favorable for moisture-proofing the gas generating agent with which the interior is filled, or the like.

Thus, in the housing 4, the internal space is divided substantially vertically into two spaces by the vertical partition wall 10 and the inner cylindrical member 40, or in other words, the first space 21 and the second space 25 are separated. Note that the internal space of the inner cylindrical member 40 is connected to the internal space of the upper shell 2 via the opening portion formed by the second end portion 47, forming the first space 21. In the first space 21 of the internal space of the housing 4, the first igniter 23, and the first gas generating agent 22 are disposed, and in the second space 25, the second igniter 27 and the second gas generating agent 26 are disposed. In this way, the gas generator 1 is configured as a dual-type gas generator including two igniters, i.e., the first igniter 23 and the second igniter 27. Note that the first igniter 23 is disposed inside the inner cylindrical member 40 being surrounded by the inner cylindrical member 40 and with the top portion of the first igniter 23 not projecting out from the second end portion 47 of the inner cylindrical member 40 to the upper shell 2 side.

Here, in the first space 21, the first igniter 23 is housed in the housing space formed by the inner cylindrical member 40, and the space thereabove (substantially the space above the vertical partition wall 10) contains the first gas generating agent 22, and the filter 32 having an annular shape is disposed surrounding the first gas generating agent 22. Additionally, a cushion 31 configured to prevent unnecessary vibrations from the first gas generating agent 22 inside the first space 21 is disposed on the inner side of the top surface 2d of the upper shell 2. The first gas generating agent 22 used is a gas generating agent having a relatively low combustion temperature. It is preferable that the first gas generating agent 22 has a combustion temperature in the range of 1000 to 1700° C. As the first gas generating agent 22, a single hole cylindrical gas generating agent including guanidine nitrate (41 wt %), basic copper nitrate (49 wt %), and a binder and an additive, for example, may be used.

The filter 32 is configured by stacking flat woven meshes made of stainless steel in the radial direction and compressing the meshes in the radial and axial directions. The filter 32 is configured to cool the combustion gas from the first gas generating agent 22 and collect combustion residue included in the combustion gas. Alternatively, a filter having a wire-wound-type structure, in which a wire is wound forming multiple layers on a core rod, may be used as the filter 32. Note that the filter 32 cools and also filters the combustion residue of the second gas generating agent 26 contained in the second space 25. In addition, a gap 33 formed between the circumferential wall 2c of the upper shell 2 and the filter 32 forms a gas passage that surrounds the filter 32 and has an annular shape in the radial direction in a cross sectional view. The gap 33 allows the combustion gas to pass through the entire area of the filter 32, and thus it is possible to achieve effective utilization of the filter 32 and effective cooling and purification of the combustion gas. The combustion gas flowing through the gap 33 reaches a gas discharge hole 5 provided in the circumferential wall 2c. In addition, to prevent moisture from entering the housing 4 from outside, the gas discharge hole 5 is closed, by an aluminum tape 34, from the inside of the housing 4 until the gas generator 1 is actuated.

Further, the second space 25 contains the second gas generating agent 26 correspondingly to the second igniter 27 fixed to the second fixing portion 3d. Further, similar to the first gas generating agent 22, for the second gas generating agent 26 as well, a single hole cylindrical gas generating agent including guanidine nitrate (41 wt %), basic copper nitrate (49 wt %), and a binder and an additive, for example, may be used.

According to such a configuration, the gas generator 1 can generate a relatively large amount of combustion gas by the combustion of the first gas generating agent 22 by actuation of the first igniter 23 and the combustion of the second gas generating agent 26 by actuation of the second igniter 27 and discharge the combustion gas to the outside. Furthermore, in the present embodiment, the second igniter 27 is actuated at a predetermined timing after the actuation timing of the first igniter 23. The actuation timing of each igniter correlates to the discharge timing of the generated combustion gas to the outside. Accordingly, depending on the discharge characteristic of the combustion gas required for the gas generator 1, the actuation timing of each igniter is determined. In this way, the overall output performance of the gas generator 1 is determined. Here it is intended that, in the gas generator 1, when the first igniter 23 is actuated, the first gas generating agent 22 burns, and the combustion gas generated in the first space 21 is discharged to the outside via the gas discharge holes 5 via the filter 32. Also, it is intended that, when the second gas generating agent 26 is combusted by the second igniter 27 that actuates after the first igniter 23, the combustion gas generated in the second space 25 flows to the third space 51 via the communication holes 48, then passes to the first space 21, and is then discharged to the outside via the filter 32 and the gas discharge holes 5. Accordingly, in the gas generator 1, in the case in which the flow of the combustion gas in the third space 51 is not appropriately controlled at each actuation of the first igniter 23 and the second igniter 27, the gas generator 1 cannot exhibit the discharge characteristic of the combustion gas intended for the gas generator 1.

Closing Member 50

Figure 3:
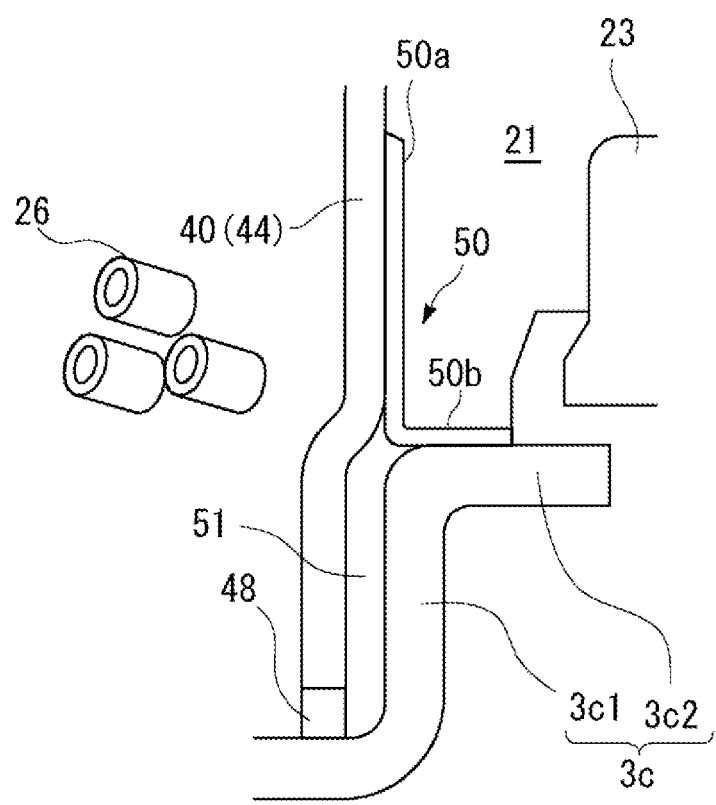
FIG. 3 is a schematic configuration diagram of a closing member provided in the gas generator illustrated in FIG. 1.

In light of the above, in the gas generator 1, the closing member 50 is disposed so that the flow of the combustion gas in the third space 51 as described above can be suitably controlled. The closing member 50 will be described with reference to FIGS. 3 and 4. As illustrated in FIG. 3, the closing member 50 includes a circumferential wall surface 50a with a cylindrical shape and an extension portion 50b with a plate-like shape that extends radially inward from the end portion of the circumferential wall surface 50a on the bottom surface 3b side. The extension portion 50b has an annular shape with a centrally located hole through which the first igniter 23 extends through. Also, the extension portion 50b bends from and is connected to the circumferential wall surface 50a. Thus, the closing member 50 overall is formed with relatively high rigidity in the connection portion region. The circumferential wall surface 50a is press-fit against the inner side of the second circumferential wall 44 of the inner cylindrical member 40. Further, when the first end portion 41 of the inner cylindrical member 40 is abutted against the bottom surface 3b of the lower shell 3, the extension portion 50b is disposed in contact with the top portion 3c2 along the top portion 3c2 of the first fixing portion 3c. As a result, by the outer surface of the circumferential wall surface 50a being in contact with the inner circumferential surface of the second circumferential wall 44 and the outer surface of the extension portion 50b being in contact with the upper surface of the top portion 3c2 of the first fixing portion 3c, the closing member 50 is fixed to the inner cylindrical member 40 with the opening portion of the third space 51 closed from the first space 21.

As the closing member 50 is fixed to the inner cylindrical member 40 in this manner, when the first igniter 23 actuates in the first space 21 and burns the first gas generating agent 22, the generated combustion gas pushes the circumferential wall surface 50a against the second circumferential wall 44 of the inner cylindrical member 40 and the combustion gas pushes the extension portion 50b against the top portion 3c2 of the first fixing portion 3c. However, roughly the entire surface of the pushed circumferential wall surface 50a is supported by the second circumferential wall 44 of the inner cylindrical member 40, and roughly the entire surface of the extension portion 50b is supported by the top portion 3c2 of the first fixing portion 3c. Thus, deformation is inhibited, and thus the closed state of the third space 51 via the closing member 50 is maintained. As a result, the combustion gas of the first gas generating agent 22 is prevented from flowing into the third space 51 from the first space 21.

Figure 4:
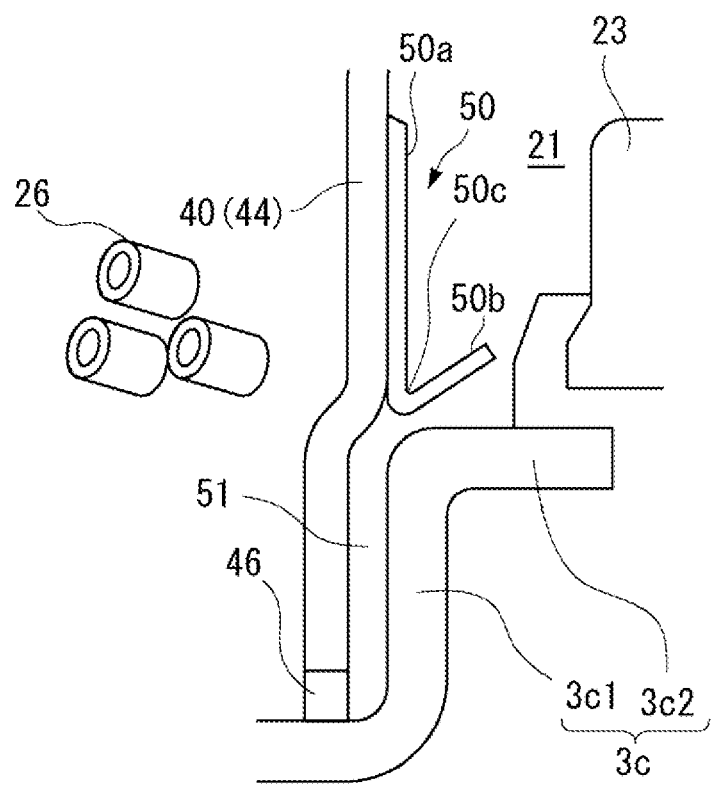
FIG. 4 is a diagram illustrating the closing member illustrated in FIG. 3 in a deformed state.

On the other hand, when the second igniter 27 actuates in the second space 25 and the second gas generating agent 26 burns, the generated combustion gas is guided into the third space 51 via the communication holes 48. As illustrated in FIG. 4, the combustion gas of the second gas generating agent 26 passes through the third space 51 and comes into contact with the extension portion 50b. This bends the extension portion 50b upward at a portion 50c at or near the connection portion region with the circumferential wall surface 50a. When the extension portion 50b deforms in this manner, the closed state of the third space 51 via the closing member 50 is negated. As a result, the combustion gas of the second gas generating agent 26 can flow into the first space 21 from the third space 51.

To summarize about the closing member 50, in the time before the first igniter 23 actuates, and in the time before the second igniter 27 actuates after the first igniter 23 has actuated, as illustrated in FIG. 3, the extension portion 50b is not deformed and is maintained in a state of being in contact with the top portion 3c2 of the first fixing portion 3c. Thus, the combustion gas of the first gas generating agent 22 passes through the filter 32 without flowing into the third space 51, and is then discharged to the outside from the gas discharge holes 5. Then, as illustrated in FIG. 4, when the second igniter 27 is then actuated, the extension portion 50b closing the third space 51 deforms. This deformation forms a gap between the top portion 3c2 of the first fixing portion 3c and the closing member 50, allowing the combustion gas of the second gas generating agent 26 to flow to the first space 21 from the third space 51. The combustion gas that has flowed into the first space 21 passes through the filter 32, and is then discharged to the outside from the gas discharge holes 5.

By the gas generator 1 being provided with the closing member 50 in this manner, the combustion gas of the first gas generating agent 22 generated by actuating the first igniter 23 can be prevented from reverse flowing to the third space 51. This can prevent combustion of the second gas generating agent 26 being initiated by the second gas generating agent 26 coming into contact with the combustion gas of the first gas generating agent 22. Accordingly, the gas generator 1 can reliably discharge to the outside the combustion gas of the first gas generating agent 22 generated by the actuation of the first igniter 23, and can reliably discharge to the outside the combustion gas of the second gas generating agent 26 generated by the actuation of the second igniter 27. That is, in the gas generator 1 including two igniters, the flow of the combustion gas in the third space 51 is suitably controlled, and the intended discharge characteristic of the combustion gas can be achieved. Furthermore, since the combustion gas of the second gas generating agent 26 passes through the filter 32 disposed in the first space 21, a filter does not need to be disposed in the second space 25. Thus, the number of components can be reduced, and the gas generator 1 can be made more compact. Note that the manner of deformation of the closing member 50 is not limited to that described above. A configuration in which, when the gas generator 1 is actuated, the closing member 50 deforms and moves (slides) upward along the inner cylindrical member 40 is not excluded from being applied to the gas generator 1 described above. The present embodiment also includes a configuration in which a first space and a third space are formed connected to one another and a shape or state is different at least before and after actuation of the gas generator 1.

Furthermore, when the pressure of the third space 51 increases due to the combustion gas of the second gas generating agent 26, pressure acts on the inner cylindrical member 40, and the inner cylindrical member 40 may move toward the top surface 2d. Here, the third space 51 has an annular shape and a constant radial width along the height direction of the cylindrical portion. Thus, in the case in which the inner cylindrical member 40 moves, the inner cylindrical member 40 moves in the center axis direction of the inner cylindrical member 40 and the cylindrical portion 3c1, maintaining a constant distance between the inner wall surface of the inner cylindrical member 40 and the outer wall surface of the cylindrical portion 3c1 of the first fixing portion 3c. Thus, the flow path area of the combustion gas in the third space 51 (that is, the cross-sectional area of the third space 51 when sectioned in a direction orthogonal to the central axis of the inner cylindrical member 40) does not change. Accordingly, in the case in which the flow rate of the combustion gas from the second gas generating agent is regulated in the third space 51, the flow rate of the combustion gas of the second gas generating agent 26 is suppressed from changing due to the movement of the inner cylindrical member 40. Thus, changes in the discharge characteristic of the combustion gas of the gas generator 1 can be suppressed. In other words, even in a situation in which pressure that moves the inner cylindrical member 40 is generated, changes in the discharge characteristic of the combustion gas can be suppressed. Furthermore, as the pressure of the combustion gas increases, the second gas generating agent 26 burns more easily. Thus, by using a second gas generating agent 26 that generates a combustion gas with a higher pressure, stable combustion can be achieved, allowing the combustion gas to be stably discharged from the gas generator 1. Thus, the cylindrical portion 3c1 of the fixing portion 3c and the portion (the first circumferential wall 42) of the inner cylindrical member 40 opposing the cylindrical portion 3c1 are formed extending parallel with the direction the inner cylindrical member 40 moves.

In addition, because the communication holes 48 are formed by the gaps between the recess portions 48a and the bottom surface 3b of the lower shell 3, the opening area of the communication holes 48 can be made relatively large. Here, when the second igniter 27 is in the initial stages of actuation, the second gas generating agent 26 near the second igniter 27 burns, but the second gas generating agent 26 near the communication holes 48 may not burn. At this time, if the opening area of the communication holes 48 is small, the communication holes 48 may be blocked by the unburned second gas generating agent 26, which may make it difficult for the combustion gas to flow into the communication holes 48. On the other hand, if the communication holes 48 are formed by the gaps between the recess portions 48a and the bottom surface 3b of the lower shell 3, the opening area can be made relatively large. Thus, even in the case in which the unburned second gas generating agent 26 is present near the communication holes 48, the combustion gas smoothly flows into the communication holes 48. Accordingly, the combustion gas can be smoothly discharged from the gas generator 1. Thus, the number of components can be reduced because a filter, for example, does not need to be provided to prevent the second gas generating agent 26 approaching the opening portions of the communication holes 48.

Furthermore, since the combustion gas generated by the second gas generating agent 26 flows from the inner cylindrical member 40 toward the cushion 31, the combustion residue of the second gas generating agent 26 adheres to the cushion 31. As such, the amount of combustion residue passing through the filter 32 can be reduced.

Modified Example of Closing Member 50

Figure 5:
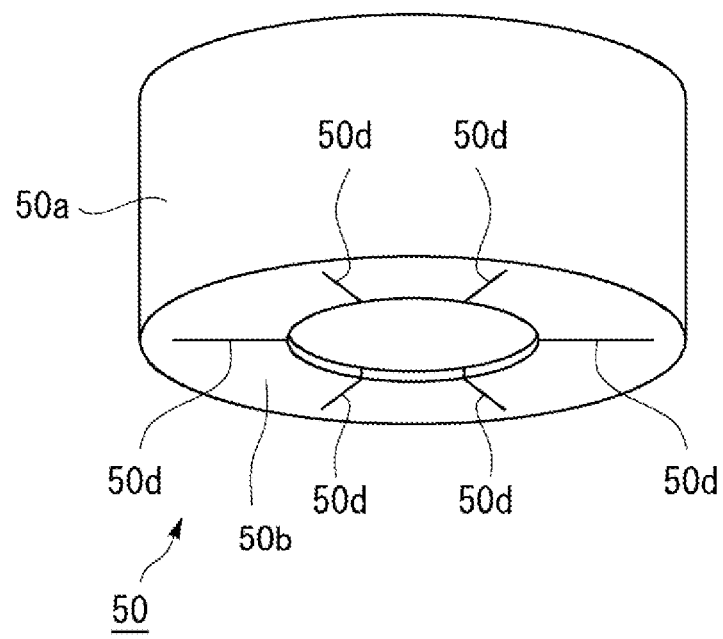
FIG. 5 is a diagram illustrating a modified example of the closing member which can be applied to the gas generator illustrated in FIG. 1.
Figure 6:
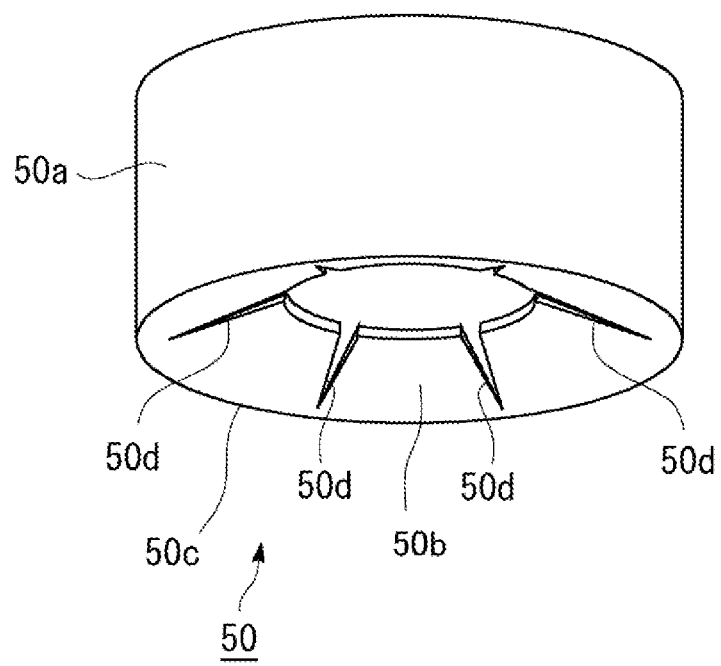
FIG. 6 is a diagram illustrating the closing member illustrated in FIG. 5 in a deformed state.

A modified example of the closing member 50 will now be described with reference to FIGS. 5 and 6. Similar to the embodiment illustrated in FIG. 3, the closing member 50 of the present modified example includes the circumferential wall surface 50a with a cylindrical shape and the extension portion 50b that extends radially inward from the circumferential wall surface 50a, with the circumferential wall surface 50a being press-fit against the inner side of the second circumferential wall 44 of the inner cylindrical member 40 and the extension portion 50b being in contact with the top portion 3c2 along the top portion 3c2 of the first fixing portion 3c. In the closing member 50 of the present modified example, a fragile portion 50d is formed in the extension portion 50b. This fragile portion 50d is a portion with a weaker strength than other portions of the extension portion 50b, and specifically, is a broken line originating from the inner end portion of the extension portion 50b (the end portion not connected to the circumferential wall surface 50a) and reaching the vicinity of the outer end portion (the end portion connected to the circumferential wall surface 50a). A plurality of the fragile portions 50d are formed radially in the extension portion 50b.

In the case in which such a closing member 50 is used, in the time before the first igniter 23 actuates, and in the time before the second igniter 27 actuates after the first igniter 23 has actuated, the extension portion 50b is not deformed and is maintained in a state of being in contact with the top portion 3c2 of the first fixing portion 3c. Thus, the combustion gas of the first gas generating agent 22 does not flow into the third space 51 and is discharged to the outside from the gas discharge holes 5. Thereafter, when the second igniter 27 actuates, the pressure from the combustion gas of the second gas generating agent 26 breaks the fragile portions 50d. As a result, as illustrated in FIG. 6, the extension portion 50b deforms by bending upward at the portion 50c at or near the connection portion region with the circumferential wall surface 50a. This deformation allows the combustion gas of the second gas generating agent 26 to flow into the first space 21 from the third space 51, and the combustion gas that has flowed into the first space 21 is discharged to the outside from the gas discharge holes 5. That is, in the gas generator 1 using the closing member 50 illustrated in FIGS. 5 and 6, the flow of the combustion gas in the third space 51 is suitably controlled, and the intended discharge characteristic of the combustion gas can be achieved. By providing the fragile portion 50d, the state of the first space and the third space being closed to one another can be more smoothly negated. Note that the manner of deformation of the closing member 50 is not limited to that described above. A configuration in which, when the gas generator 1 is actuated, the closing member 50 deforms and moves (slides) upward along the inner cylindrical member 40 is not excluded from being applied to the gas generator 1 described above. The modified examples of the present embodiment also include a configuration in which a first space and a third space are formed connected to one another and a shape or state is different at least before and after actuation of the gas generator 1.

Modified Example of Inner Cylindrical Member 40

A modified example of the inner cylindrical member 40 will be described. In FIG. 2, the recess portions 48a and the protrusion portions 48b are disposed evenly in the circumferential direction of the inner cylindrical member 40. However, the recess portions 48a and the protrusion portions 48b are not necessarily disposed evenly in the circumferential direction of the inner cylindrical member 40. For example, the shape and arrangement of the recess portions 48a and the protrusion portions 48b may be adjusted so that the combustion gas of the second gas generating agent 26 flows evenly in the third space from the inner cylindrical member 40. Here, when the second igniter 27 actuates, the second gas generating agent 26 burns triggered by the second igniter 27. Thus, the combustion gas of the second gas generating agent 26 quickly reaches a section of the inner cylindrical member 40 where the distance to the second igniter 27 is close, and the combustion gas of the second gas generating agent 26 slowly reaches a section of the inner cylindrical member 40 where the distance from the second igniter 27 is far. Accordingly, in the circumferential direction of the inner cylindrical member 40, the arrival time of the combustion gas of the second gas generating agent 26 is different. Thus, in the case in which the recess portions 48a and the protrusion portions 48b are evenly disposed in the circumferential direction of the inner cylindrical member 40, the flow of the combustion gas in the third space 51 may be not even. Accordingly, in the case in which the desired discharge characteristic of the combustion gas is not obtained, to obtain the desired discharge characteristic of the combustion gas, the shape and arrangement of the recess portions 48a and the protrusion portions 48b are adjusted so that the flow of the combustion gas in the third space 51 is more even. In this case, for example, by disposing the recess portions 48a and the protrusion portions 48b so that the communication holes 48 are smaller near the second igniter 27, the flow of much of the combustion gas to a section of the inner cylindrical member 40 where the distance to the second igniter 27 is near can be reduced.

Also, at least one or all of the protrusion portions 48b are not required to abut against the bottom surface 3b of the lower shell 3. In other words, the projection amount of the protrusion portions 48b may be different. Further, the communication holes 48 according to FIGS. 1 and 2 are formed by the gaps between the recess portions 48a, which are removed portions of the circumferential edge of the inner cylindrical member 40, and the bottom surface 3b of the lower shell 3. However, instead of this, the circumferential edge of the inner cylindrical member 40 may not be removed, and through-holes connecting the inner space and the outer space of the inner cylindrical member 40 may be formed further upward from the circumferential edge, these through-holes corresponding to the communication holes 48. Also, the recess portions 48*a* are formed by removing portions of the first end portion 41 to form rectangles when viewed from the radial direction of the inner cylindrical member 40, but the shape to be cut is not limited thereto, and the shape may be a discretionary shape, such as a square, circle, ellipse, polygonal, and the like. In any case, the communication holes 48 are formed so that the second gas generating agent 26 does not enter the third space 51, that is, such that the size of the communication holes 48 is smaller than the size of the second gas generating agent 26.

Furthermore, the projection portions 49 formed on the inner cylindrical member 40 are not necessarily required. For example, the inner cylindrical member 40 can be positioned via the circumferential wall 12 of the vertical partition wall 10 or can be positioned by joining the protrusion portions 48*b* of the inner cylindrical member 40 to the bottom surface 3*b* of the lower shell 3 (for example, via welding or bonding). In such cases, the third space can be suitably formed even while the projection portions 49 are omitted.

REFERENCE SIGNS LIST

1: Gas generator
4: Housing
5: Gas discharge port
10: Vertical partition wall
21: First space
22: First gas generating agent
23: First igniter
25: Second space
26: Second gas generating agent
27: Second igniter
40: Inner cylindrical member
48: Communication hole
49: Projection portion
50: Closing member
50*a*: Circumferential wall surface
50*b*: Extension portion
50*d*: Fragile portion
51: Third space

The invention claimed is:

1. A gas generator, comprising:
a housing;
a first igniter disposed inside the housing;
a second igniter disposed inside the housing that actuates concurrent to or later than the first igniter;
a partition wall that partitions inside the housing into a first space in which the first igniter is housed and that contains a first gas generating agent burnt by the first igniter and a second space in which the second igniter is housed and that contains a second gas generating agent burnt by the second igniter;
a discharge port provided in the housing that connects the first space and an outside of the housing; and
an inner cylindrical member with a cylindrical shape housing therein the first igniter, an inner space of the inner cylindrical member being a portion of the first space,
the housing including a fixing portion that extends from a bottom surface of the housing toward a top surface and fixes the first igniter,
the inner cylindrical member including,
a communication portion provided at a first end portion corresponding to an end portion of the inner cylindrical member on a side of the fixing portion and that connects the inner space of the inner cylindrical member and the second space outside of the inner cylindrical member; and
a closing member that closes, from the first space, a third space that is formed between an inner wall surface of the inner cylindrical member and an outer wall surface of the fixing portion and that connects the communication portion with the first space, the closing member being inhibited from deforming due to pressure from a side of the first space and allowing deformation due to pressure from a side of the third space that negates a closed state between the first space and the third space.

2. The gas generator according to claim 1, wherein
the inner cylindrical member includes a projection portion that projects toward the inner space and abuts a cylindrical portion formed on the fixing portion; and
a space formed by the inner wall surface of the inner cylindrical member not in contact with the cylindrical portion and an outer wall surface of the cylindrical portion is the third space.

3. The gas generator according to claim 2, wherein
the communication portion is formed by a gap between the first end portion of the inner cylindrical member and the bottom surface of the housing.

4. The gas generator according to claim 3, wherein
the first end portion of the inner cylindrical member includes removed portions, which are portions partially removed from a circumferential edge of the first end portion; and
the communication portion is formed by the gap between the removed portions and the bottom surface of the housing.

5. The gas generator according to claim 1, wherein
the communication portion is formed by a gap between the first end portion of the inner cylindrical member and the bottom surface of the housing.

6. The gas generator according to claim 5, wherein
the first end portion of the inner cylindrical member includes removed portions, which are portions partially removed from a circumferential edge of the first end portion; and
the communication portion is formed by the gap between the removed portions and the bottom surface of the housing.

7. The gas generator according to claim 1, wherein
the closing member is disposed and located on the inner wall surface of the inner cylindrical member on the side of the first space and closing an opening portion of the third space to the first space.

8. The gas generator according to claim 7, wherein
the closing member includes,
a circumferential wall surface extending along the inner cylindrical member, and
an extension portion extending from at or near an end portion of the circumferential wall surface in an extension direction and extending inward in a radial direction of the inner cylindrical member to the fixing portion, the extension portion closing the opening portion of the third space to the first space.

9. The gas generator according to claim 8, wherein
the extension portion includes a fragile portion that is provided with a less strength than other portions of the extension portion and that deforms due to the allowed deformation caused by a combustion product of the second gas generating agent.

10. The gas generator according to claim 8, wherein
the closing member is fixed to the inner cylindrical member with the opening portion of the third space such that the circumferential wall surface is press-fit against an inner side of a circumferential wall of the inner cylindrical member, and the extension portion is disposed in contact with a top portion along the top portion of the fixing portion.

11. The gas generator according to claim 9, wherein
the fragile portion is a broken line originating from the inner end portion of the extension portion and reaching the vicinity of the outer end portion and is formed radially in an extension portion.

12. The gas generator according to claim 5, wherein
the closing member is disposed and located on the inner wall surface of the inner cylindrical member on the side of the first space and closing an opening portion of the third space to the first space.

13. The gas generator according to claim 12, wherein
the closing member includes,
a circumferential wall surface extending along the inner cylindrical member, and
an extension portion extending from at or near an end portion of the circumferential wall surface in an extension direction and extending inward in a radial direction of the inner cylindrical member to the fixing portion, the extension portion closing the opening portion of the third space to the first space.

14. The gas generator according to claim 13, wherein
the extension portion includes a fragile portion that is provided with a less strength than other portions of the extension portion and that deforms due to the allowed deformation caused by a combustion product of the second gas generating agent.

15. The gas generator according to claim 14, wherein
the fragile portion is a broken line originating from the inner end portion of the extension portion and reaching the vicinity of the outer end portion and is formed radially in an extension portion.

16. The gas generator according to claim 5, wherein
the communication portion is smaller near the second igniter such that the flow of much of the combustion gas to a section of the inner cylindrical member where the distance to the second igniter is near can be reduced.

17. The gas generator according to claim 1, wherein
the partition wall vertically partitioning an internal space of the housing into an upper space and a lower space;
A the inner cylindrical member extends through the partition wall, the first end portion of the inner cylindrical member is located in the lower space, and a second end portion corresponding to an end portion on a side opposite the first end portion of the inner cylindrical member is located in the upper space; and
the first space is formed with the inner space of the inner cylindrical member connected to the upper space and a space around the inner cylindrical member of the lower space is the second space.

18. The gas generator according to claim 17, further comprising
a filter disposed in the first space that cools or filters a combustion product of the first gas generating agent and the second gas generating agent.

19. The gas generator according to claim 1, further comprising
a filter disposed in the first space that cools or filters a combustion product of the first gas generating agent and the second gas generating agent.

\* \* \* \* \*